US008785770B2

(12) United States Patent
Gingrich

(10) Patent No.: US 8,785,770 B2
(45) Date of Patent: Jul. 22, 2014

(54) ARC-RESISTANT SWITCHGEAR ENCLOSURE WITH VENT ARRANGEMENT OF A LOWER COMPARTMENT

(71) Applicant: Paul W. Gingrich, Fulton, MO (US)

(72) Inventor: Paul W. Gingrich, Fulton, MO (US)

(73) Assignee: Central Electric Company, Fulton, MO (US)

(*) Notice: Subject to any disclaimer, the term of this patent is extended or adjusted under 35 U.S.C. 154(b) by 128 days.

(21) Appl. No.: 13/676,828

(22) Filed: Nov. 14, 2012

(65) Prior Publication Data

US 2014/0131090 A1    May 15, 2014

(51) Int. Cl.
*H05K 7/20* (2006.01)
*H02B 1/56* (2006.01)

(52) U.S. Cl.
CPC ..................................... *H02B 1/565* (2013.01)
USPC ........................ 174/17 VA; 361/605; 454/184

(58) Field of Classification Search
CPC ................................................. H05K 7/20136
USPC ........ 361/605; 174/17 VA; 218/157; 454/184
See application file for complete search history.

(56) References Cited

U.S. PATENT DOCUMENTS

| | | | |
|---|---|---|---|
| 5,193,049 A | 3/1993 | Jackson | |
| 5,574,624 A | 11/1996 | Rennie et al. | |
| 5,578,792 A | 11/1996 | Devonald, III et al. | |
| 6,175,486 B1 * | 1/2001 | Ponsioen | 361/605 |
| 6,215,654 B1 | 4/2001 | Wilkie, II et al. | |
| 6,229,690 B1 * | 5/2001 | Fivelstad et al. | 361/605 |
| 6,407,331 B1 * | 6/2002 | Smith et al. | 174/50 |
| 6,410,844 B1 * | 6/2002 | Bruner et al. | 174/17 VA |
| 6,417,443 B1 * | 7/2002 | Smith | 174/17 VA |
| 7,054,143 B2 | 5/2006 | Eiselt et al. | |
| 7,236,352 B2 | 6/2007 | Dalis | |
| 7,821,774 B2 | 10/2010 | Josten et al. | |
| 7,952,857 B1 | 5/2011 | Motley et al. | |
| 8,101,881 B2 | 1/2012 | Miller et al. | |
| 8,242,395 B2 * | 8/2012 | Josten et al. | 200/306 |
| 8,492,662 B2 * | 7/2013 | Ballard et al. | 174/522 |
| 2006/0152889 A1 * | 7/2006 | Dalis | 361/605 |
| 2007/0097604 A1 * | 5/2007 | Bruski et al. | 361/605 |
| 2011/0299226 A1 | 12/2011 | Milovac et al. | |

* cited by examiner

*Primary Examiner* — Hung Ngo
(74) *Attorney, Agent, or Firm* — Geoffrey A. Mantooth

(57) ABSTRACT

An arc-resistant switchgear enclosure is designed so that an arc explosion in any interior compartment is isolated from the remaining interior compartments and vented to the exterior of the enclosure. The enclosure has upper and lower front compartments and a rearward compartment. The lower front compartment vents to the exterior of the enclosure between the upper front compartment and the rearward compartment. An extension extends across this vent between the upper front compartment and the rearward compartment, the extension being part of one of the upper front compartment or the rearward compartment. The extension houses electrical connections between the rearward compartment and the upper front compartment.

7 Claims, 6 Drawing Sheets

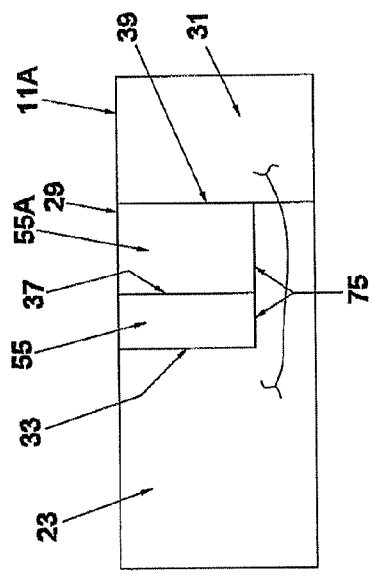
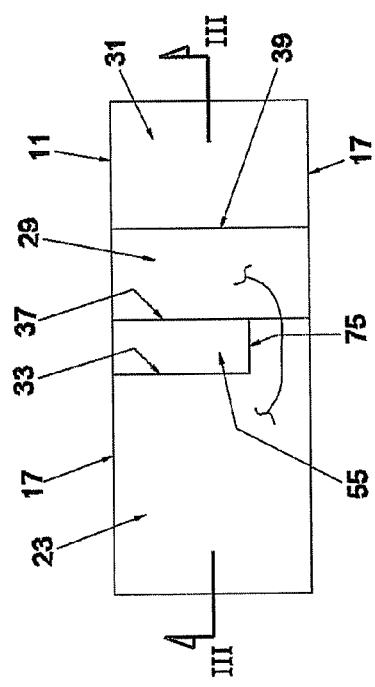
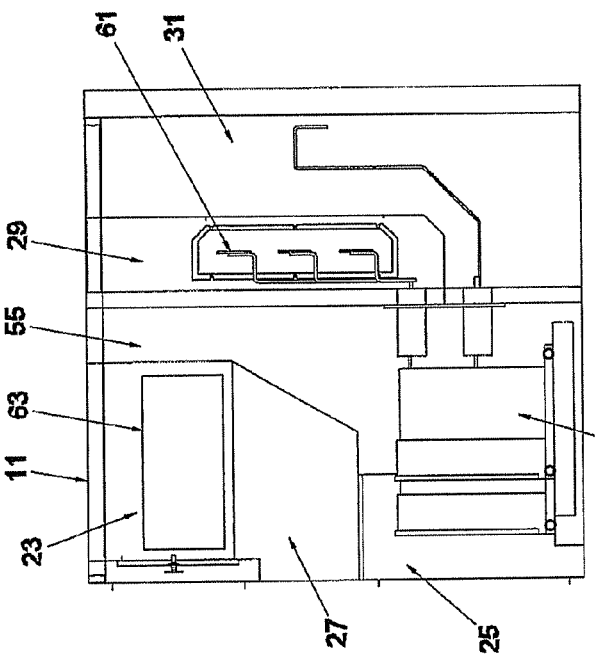

ARC-RESISTANT SWITCHGEAR ENCLOSURE WITH VENT ARRANGEMENT OF A LOWER COMPARTMENT

FIELD OF THE INVENTION

The present invention relates to arc-resistant switchgear enclosures and in particular to venting arrangements therefor.

BACKGROUND OF THE INVENTION

Arc-resistant switchgear enclosures house medium voltage electrical switchgear components such as potential transformers (PT), fuses, circuit breakers, etc. A typical enclosure has plural compartments, with each compartment housing one or more electrical components. Medium voltage generally is in the 5-38 KV range.

Such medium voltage electrical components can experience arc faults. An arc fault creates an explosion of hot gasses which can endanger nearby personnel and equipment.

In order to protect nearby personnel and equipment, enclosures are metal clad and are designed to contain the explosion and vent the explosive gasses in a controlled manner. Personnel and equipment at the front, sides and rear of an enclosure are protected by the walls of the enclosure. The explosive gasses are typically vented up into a plenum which channels the explosive gasses to a safe area, such as a building exterior.

Arc-resistant switchgear enclosures are rated according to the levels of protection provided. A type 2B enclosure is required to protect persons and property outside of the enclosure from an arc fault explosion occurring inside of the enclosure. In the event of an arc fault explosion occurring inside of a compartment, the explosion vents to other compartments inside the enclosure and outside the enclosure into the plenum. Generally, the entire contents of the enclosure are damaged.

In contrast, a type 2C enclosure not only protects outside of the enclosure, but the other compartments inside of the enclosure as well. In the event of an arc fault explosion occurring in one compartment, the explosive gasses are vented into the plenum, while the remaining compartments and their equipment remain isolated due to the dividing walls between the compartments.

Arc-resistant switchgear enclosures typically have a front side and a rear side. The front side is provided with one or more doors to access the front compartment or compartments. Front compartments are preferred for their ease of access by personnel. While type 2B enclosures may have two front compartments for high voltage equipment, which compartments are vertically stacked on top of each other, prior art type 2C enclosures lack this feature. Instead prior art type 2C enclosures have only one front compartment for high voltage equipment due to the need to isolate the compartments from one another in the event of an arc fault explosion.

It is desired to have two front compartments in a type 2C enclosure, which two front compartments can house or contain high voltage equipment.

SUMMARY OF THE INVENTION

An arc-resistant switchgear enclosure comprises exterior walls. Plural compartments are within the exterior walls and include stacked first and second front compartments, with the first front compartment above the second front compartment. There is also a rearward compartment. Each of the compartments are formed by dividing walls that isolate the respective compartment from the other compartments so as to contain an arc fault explosion in the respective compartment from the other compartments. Each of the compartments has a vent in one of the exterior walls to vent an arc fault explosion. The vent of the second front compartment is a second vent and is between the first front compartment and the rearward compartment. One of the first front compartment or the rearward compartment has an extension across the second vent to the other of the rearward compartment or the first front compartment. The extension isolates an arc fault explosion in the respective one of the first front compartment or the rearward compartment from the second front compartment and also from the other of the rearward compartment or the first front compartment. Electrical conductors extend from the rearward compartment to the first front compartment through the extension.

In accordance with one aspect, there is a first dividing wall between the first front compartment and the vent of the second front compartment. There is a second dividing wall between the rearward compartment and the vent of the second front compartment. The extension comprises walls between the first and second dividing walls.

In accordance with another aspect, the electrical conductors in the extension pass through an opening in the respective first and second dividing walls on the other of the first front compartment or the rearward compartment.

In accordance with another aspect, the vent of the second front compartment is smaller than the vent of the first front compartment.

In accordance with another aspect, the rearward compartment is an intermediate compartment. There further comprises a rear compartment, with the intermediate compartment between the rear compartment and the first and second front compartments. the extension extends between the rear compartment and the first front compartment.

In accordance with another aspect, the vents of the second front compartment and the intermediate compartment are smaller than the vent of the first front compartment.

In accordance with another aspect, non-conductive supports are provided for the electrical conductor in the extension.

BRIEF DESCRIPTION OF THE DRAWINGS

FIG. 2 is a schematic plan view of the door of the enclosure of FIG. 1 showing the compartments therein.

FIG. 3 is a cross-sectional view, taken through lines of FIG. 2.

FIG. 6 is a schematic plan view of the enclosure in accordance with another embodiment.

DESCRIPTION OF THE PREFERRED EMBODIMENTS

The arc-resistant switchgear enclosure described herein provides a type 2C enclosure with upper and lower front high voltage compartments, all in a compact size. As a type 2C enclosure, an arc fault explosion in each compartment is vented to the exterior of the enclosure independently of the other compartments. Compartments do not share vent passages. This preserves the equipment from damage in those non-faulting compartments. In addition, instead of a single front high voltage compartment, two front high voltage compartments are provided. Front high voltage compartments are preferred because of the ease of access of those compartments by personnel.

In the industry, such compartments are referred to as high voltage compartments even though the enclosure is rated for medium voltages of 5-38 KV. The voltage is high relative to voltages people are ordinarily exposed to (e.g. 120 V).

Figure 1:
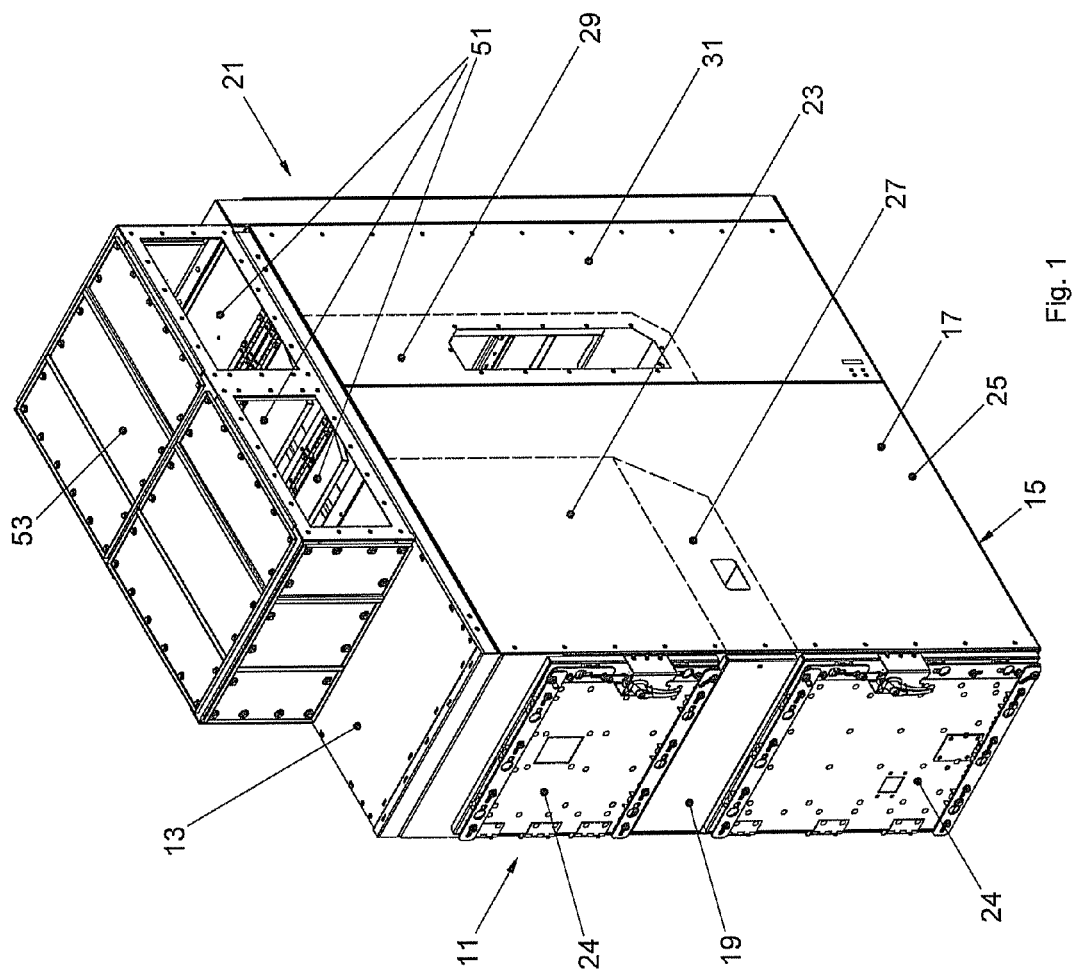
FIG. 1 is a perspective view of an arc-resistant switchgear enclosure, showing the front, left and top sides.

FIGS. 1-3 show an arc-resistant switchgear enclose 11. The enclosure has exterior walls, namely top, bottom, sides, front and rear walls 13, 15, 17, 19, 21. Interior walls form interior compartments. There is an upper front compartment 23, accessible by an upper front door 24, and a lower front compartment 25, accessible by a lower front door 24. A control compartment 27 may be provided between the upper and lower front compartments 23, 25. To the rear of the front compartments is an intermediate compartment 29 and to the rear of that is a rear compartment 31. The front compartments 23, 25, the intermediate compartment 29 and the rear compartment 31 are all capable of housing high voltage switchgear components. As discussed in more detail below, these high voltage compartments require venting, with a vent for each compartment. The control compartment 27 contains lower voltage equipment and therefore does not require venting.

Figure 4:
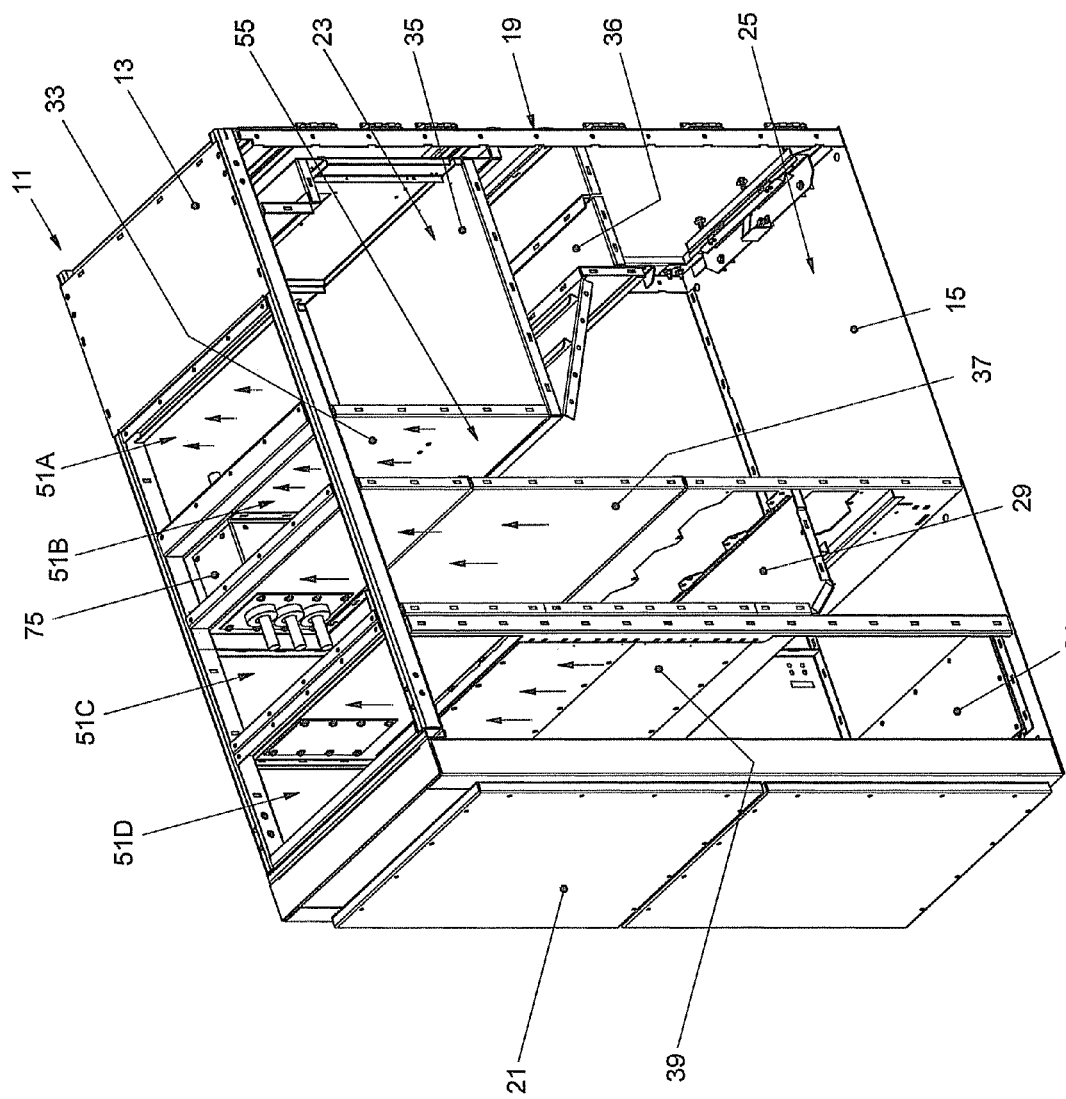
FIG. 4 is a cut away perspective front view of the enclosure of FIG. 1 showing the rear, right and top sides.

Referring to FIGS. 1 and 4, the upper front compartment 23 is formed by top, front and side exterior walls 13, 19, 17 of the enclosure and by interior walls, namely a first dividing wall 33 and a bottom wall 35. The lower front compartment 25 is formed by the bottom and side exterior walls 15, 17 of the enclosure, and by interior walls, namely the bottom wall 36 of the control compartment and a second dividing wall 37. The intermediate compartment 29 is formed by the exterior top and side walls 13, 17 of the enclosure and by interior walls, namely the second dividing wall 37 and rear dividing wall 39. The rear compartment 31 is formed by top, rear, bottom and side exterior walls of the enclosure, as well as by the rear dividing wall 39.

The compartments are used to house high voltage switchgear such as potential transformers, fuses, circuit breakers, bus bars, etc.

The enclosure is a type 2C, meaning that each compartment vents an arc fault explosion therein directly to the exterior of the enclosure, and not to other interior compartments. Vent openings 51 are provided in the top wall 13. A plenum 53 (see FIG. 1) encloses the top wall and these vents. The plenum vents to the outside of the building housing the enclosure or enclosures. The exterior walls and the interior dividing walls of the enclosure are made of steel or other material in order to withstand an arc fault explosion.

Referring to FIG. 4, the upper front compartment 23 vents to a first vent 51A. The lower front compartment 25 vents to a second vent 51B by way of a ventway 55. The ventway is between dividing walls 33, 37. The ventway is isolated from the upper front and intermediate compartments 23, 29 by these dividing walls. The intermediate compartment 29 vents to a third vent 51C. The rear compartment 31 vents to a fourth vent 51D. A portion of the rear compartment 31 may be located beneath the intermediate compartment 29. In other words, the intermediate compartment 29, like the upper front compartment 23, need not extend at the bottom wall 15. Not shown in the drawings are vent flaps covering the vents 51. These vents are normally open during operation to allow for circulation of ventilation air, but close in the event of an arc fault explosion in another compartment, thereby isolating the respective compartment.

Even though the compartments are isolated from one another to prevent damage from an arc fault explosion, the compartments have electrical collections to one another. Typically, the intermediate compartment 29 contains a bus 61 (see FIG. 3). Switchgear components 63 of the other compartments are electrically connected to the bus. The adjacent compartments, namely the rear compartment 31 and the lower front compartment 25 are connected through the respective dividing walls. For example, the switchgear component in the lower front compartment 25 is connected to the bus 61 and the intermediate compartment 29 through the dividing wall 37. Likewise, the switchgear component in the rear compartment 31 is connected to the bus in the intermediate compartment through the rear dividing wall 39.

The electrical connections through a compartment wall can be cables, either non-shielded or shielded, a bus bar, etc. Non-shielded cable is insulated. The electrical conductors pass through one or more openings in the dividing wall between the two compartments. An insulator, such as a porcelain piece, lines the outline of the opening, isolating the conductor from the dividing wall.

Figure 5:
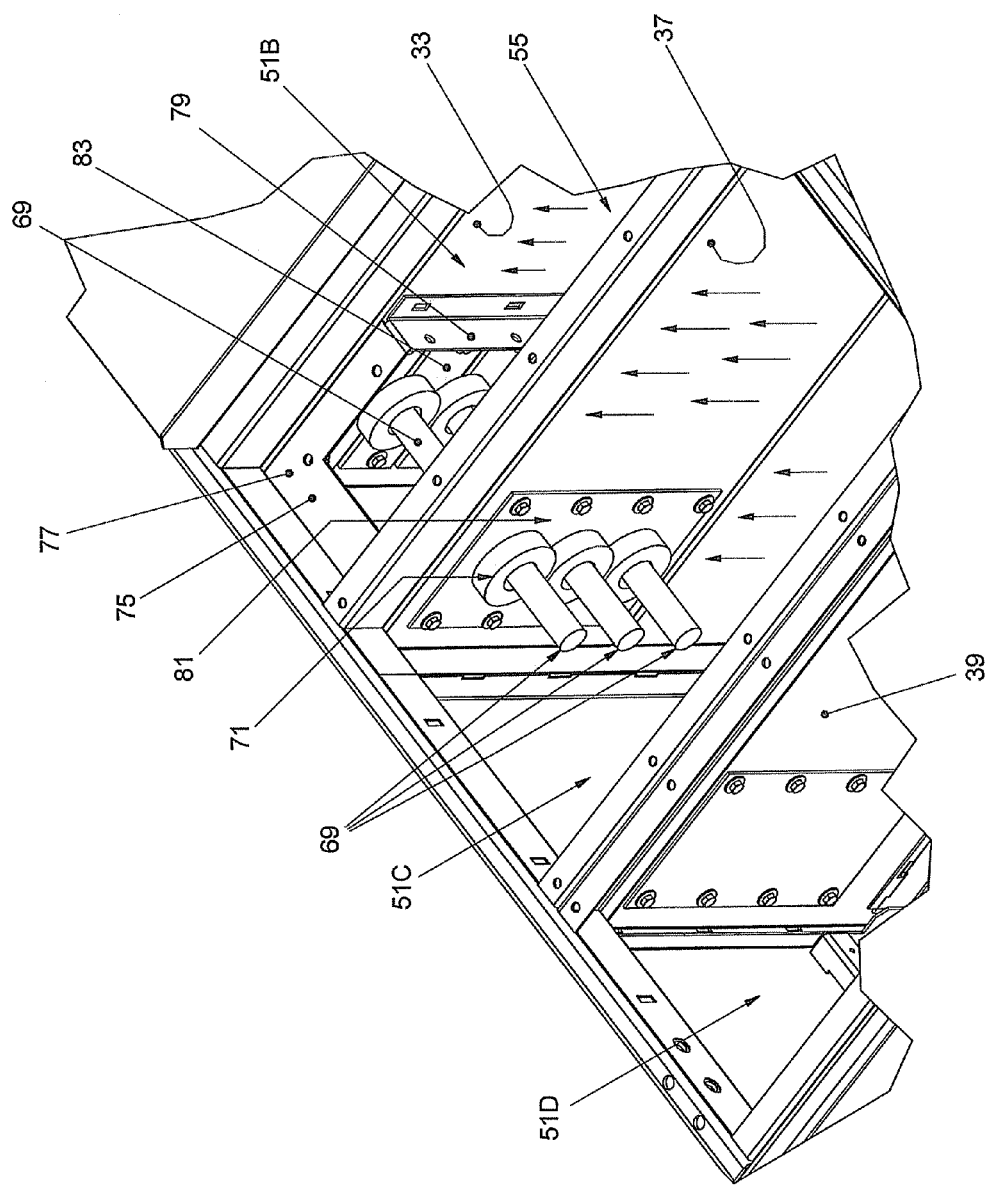
FIG. 5 is a close up of the extension, cut partially open, of FIG. 4.

FIG. 5 shows an example of conductors 69 passing through a dividing wall. Each conductor 69 also passes through a toroidal insulator 71. Because three phase is used, three conductors form the electrical connection, a conductor for each phase. The enclosure walls are grounded.

In prior art type 2C enclosures, the upper front compartment would not share a dividing wall with the intermediate compartment 29. However, in the enclosure shown, the upper front compartment 23 is extended to the intermediate compartment 29 so that electrical conductors can connect the two compartments together. The extension 75 is made up of steel walls. As shown in FIGS. 4 and 5, the extension includes the exterior side walls 17 of the enclosure, a top wall 77, a bottom wall and a side wall 79. The top, bottom and side walls extend between the dividing walls 33, 37. The conductors 69 pass through the dividing wall 37 into the intermediate compartment 29 as shown in FIGS. 4 and 5. In the embodiment shown, a rectangular opening is cut in the dividing wall 37. A steel plate 81 covers the opening; the conductors pass through this plate via insulators 71. This plate 81 thus forms part of the dividing wall 37 and preserves the separation between the upper front compartment 23 and the intermediate compartment 29. The dividing wall 33 also has a rectangular opening cut therein for the conductors 69. Non-conductive slats 83, such as are made out of fiberglass, provide support for the conductors passing through this opening. Gaps are provided between the slats. The interior of the extension 75 communicates with the interior of the remainder of the upper front compartment 23.

The ventway 55 is between the extension 75 and the opposite enclosure side wall 17 (see FIG. 2). In the preferred embodiment, the extension 75 is as small as possible so that the ventway 55 can be as large as possible. The conductors 69 are centered in the extension between the two side walls 17, 79, and are vertically oriented with respect to one another to assist in minimizing the horizontal size of the extension (some spacing is maintained between the conductors and the walls of the extension to prevent arc to the ground enclosure walls).

In the event of an arc fault explosion in the lower front compartment 25, the explosive gasses do not enter other compartments and vent up the ventway 55, out of the vent 51B and into the plenum. Likewise, if the upper front compartment 23 experiences an arc fault explosion, it does not enter other compartments, and the explosion escapes out of the vent 51A into the plenum. The provision of the extension 75 allows the upper front compartment 23 to house high voltage equipment and still maintain the type 2C rating, wherein an arc fault explosion is confined to the particular compartment it originates in.

Likewise, an arc fault explosion in either the intermediate compartment 29 or the rear compartment 31 vents through their respective vents 51C, 51D into the plenum and does not enter the other compartments.

Figure 7:
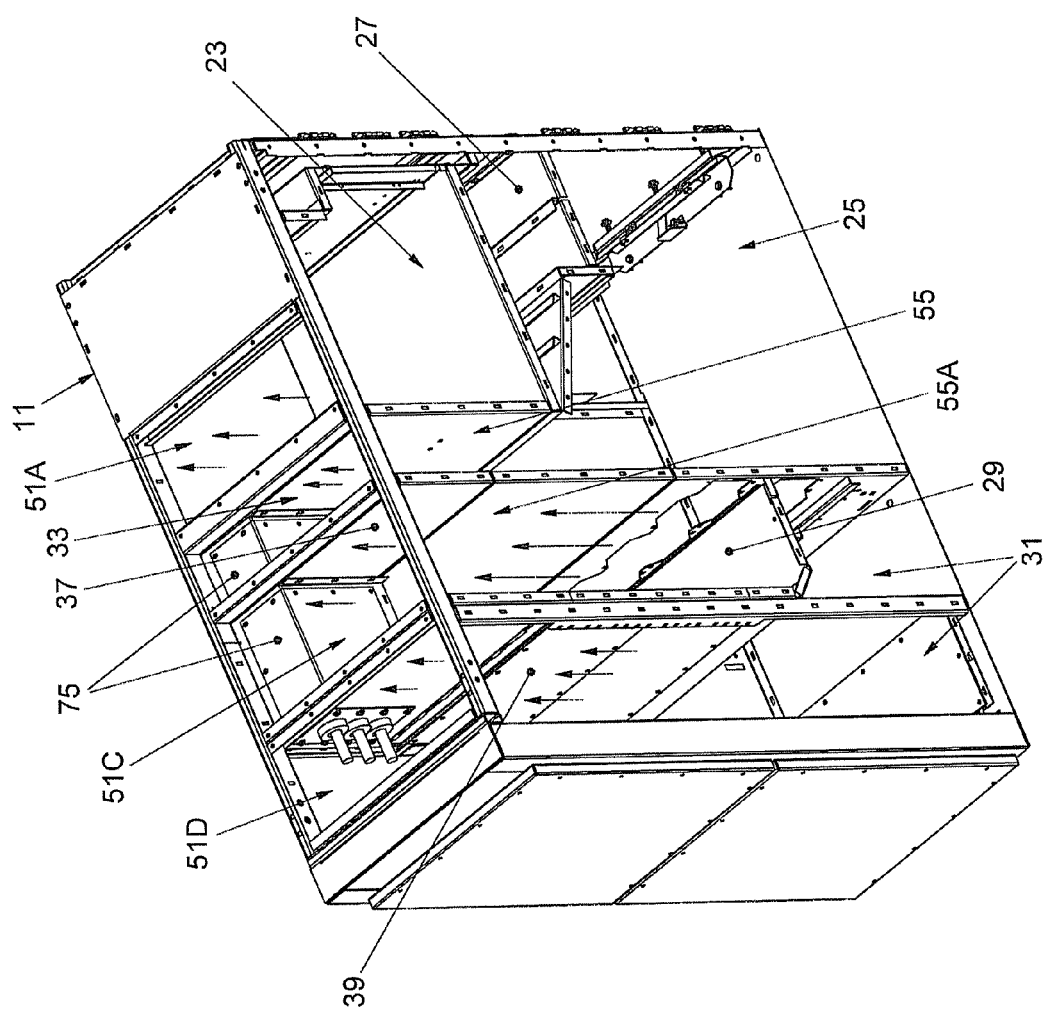
FIG. 7 is a cut away perspective view of the enclosure of FIG. 6, showing the right rear and top sides.
Figure 8:
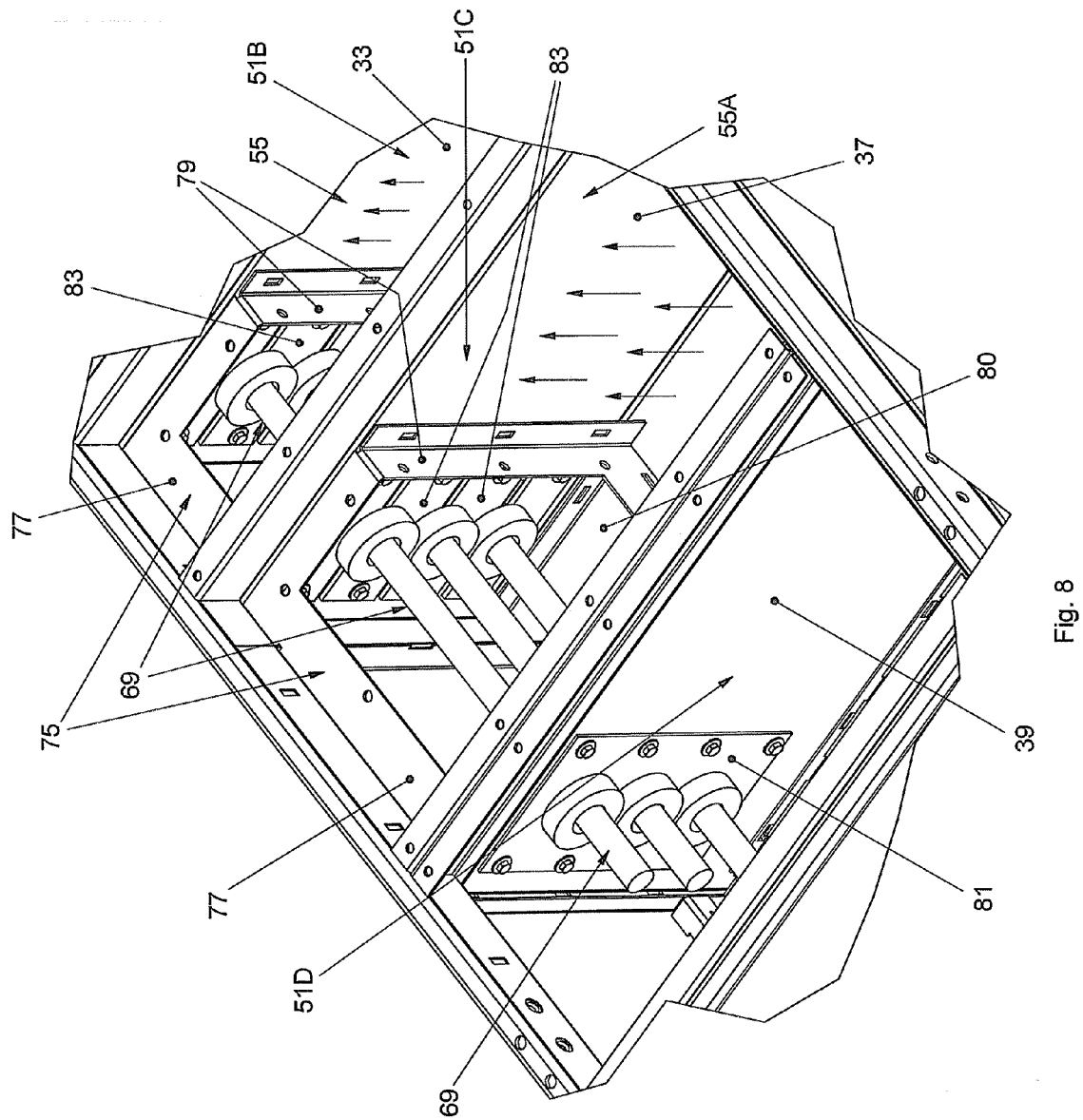
FIG. 8 is a close up of the extension, cut partially open, of FIG. 6.

FIGS. 6-8 illustrate another embodiment of the enclosure 11A. In this embodiment, the upper front compartment 23 extends to the rear compartment 31. The extension 75 passes through not only the dividing wall 33, but dividing walls 37 and 39. Because the extension traverses two ventways 55, 55A, there are two parts to the extension, one for each ventway. Each part has a top wall 77 and a side wall 79 and a bottom wall 80, with one of the side walls being the enclosure exterior side wall 17. The openings in the dividing walls 33 and 37 have non-conductive slats 83 to support the conductors separately, while the opening through the rear dividing wall 39 has a steel plate in order to isolate the rear compartment from the interior of the extension and thus the remainder of the upper front compartment 23.

An arc fault explosion in the lower front compartment 25 vents as described above through the ventway 55. An arc fault explosion in the intermediate compartment 29 vents through its ventway 55A and out vent 51C and into the plenum. The other compartments, including the upper front compartment, is shielded from any such explosion. The upper front compartment 23 extends to the rear dividing wall 39 by way of the extension 75. An arc fault explosion occurring in the upper front compartment 23 vents out the vent 51A and is isolated from the other compartments. Likewise, an arc fault explosion in the rear compartment 31 vents out the vent 51D and is isolated from the other compartments.

Although the extensions 75 have been shown along the side wall of the enclosure, the extensions can be positioned in other locations. For example, the extension can be located away from an exterior side wall so as to have the respective ventway vent on both sides of the extension. In addition, the bottom wall of the extension can be sloped or angled to direct an explosion into the ventway.

Furthermore, although the extension has been shown and described as extending from the upper front compartment 23 to a rearward compartment such as the intermediate compartment 29 or the rear compartment 31, it could be configured as an extension of the rearward compartment toward the upper front compartment. For example, referring to FIGS. 4 and 5, the steel plate 81 would cover the opening in the front dividing wall 33 and conductive slats 83 would be used in the opening of the dividing wall 37. In the case where the rearward compartment would be the rear compartment 31, referring to FIGS. 6 and 7, the extension could be from that rear compartment to the upper front compartment. The dividing wall 33 would have a steel plate 81 with the other dividing walls 37, 39 having non-conductive slats 83 so as to allow communication between the rear compartment and the extension.

The foregoing disclosure and showings made in the drawings are merely illustrative of the principles of this invention and are not to be interpreted in a limiting sense.

The invention claimed is:

1. An arc-resistant switchgear enclosure, comprising:
 a) exterior walls;
 b) plural compartments within the exterior walls including stacked first and second front compartments, with the first front compartment above the second front compartment, and a rearward compartment, each of the compartments formed by dividing walls that isolate the respective compartment from the other compartments so as to contain an arc fault explosion in the respective compartment from the other compartments;
 c) each of the compartments having a vent in one of the exterior walls to vent an arc fault explosion, the vent of the second front compartment being a second vent and being between the first front compartment and the rearward compartment;
 d) one of the first front compartment or the rearward compartment having an extension across the second vent to the other of the rearward compartment or the first front compartment, the extension isolating an arc fault explosion in the respective one of the first front compartment or the rearward compartment from the second front compartment and also from the other of the rearward compartment or the first front compartment;
 e) electrical conductors extending from the rearward compartment to the first front compartment through the extension.

2. The arc-resistant switchgear enclosure of claim 1, further comprising:
 a) a first dividing wall between the first front compartment and the vent of the second front compartment;
 b) a second dividing wall between the rearward compartment and the vent of the second front compartment;
 c) the extension comprising walls between the first and second dividing walls.

3. The arc-resistant switchgear enclosure of claim 2, wherein the electrical conductors in the extension pass through an opening in the respective first and second dividing walls on the other of the first front compartment or the rearward compartment.

4. The arc-resistant switchgear enclosure of claim 1, wherein the vent of the second front compartment is smaller than the vent of the first front compartment.

5. The arc-resistant switchgear enclosure of claim 1, wherein the rearward compartment is an intermediate compartment, further comprising a rear compartment, with the intermediate compartment between the rear compartment and the first and second front compartments, the extension extending between the rear compartment and the first front compartment.

6. The arc-resistant switchgear enclosure of claim 5, wherein the vents of the second front compartment and the intermediate compartment are smaller than the vent of the first front compartment.

7. The arc-resistant switchgear enclosure of claim 1, further comprising non-conductive supports for the electrical conductor in the extension.

* * * * *